UNITED STATES PATENT OFFICE.

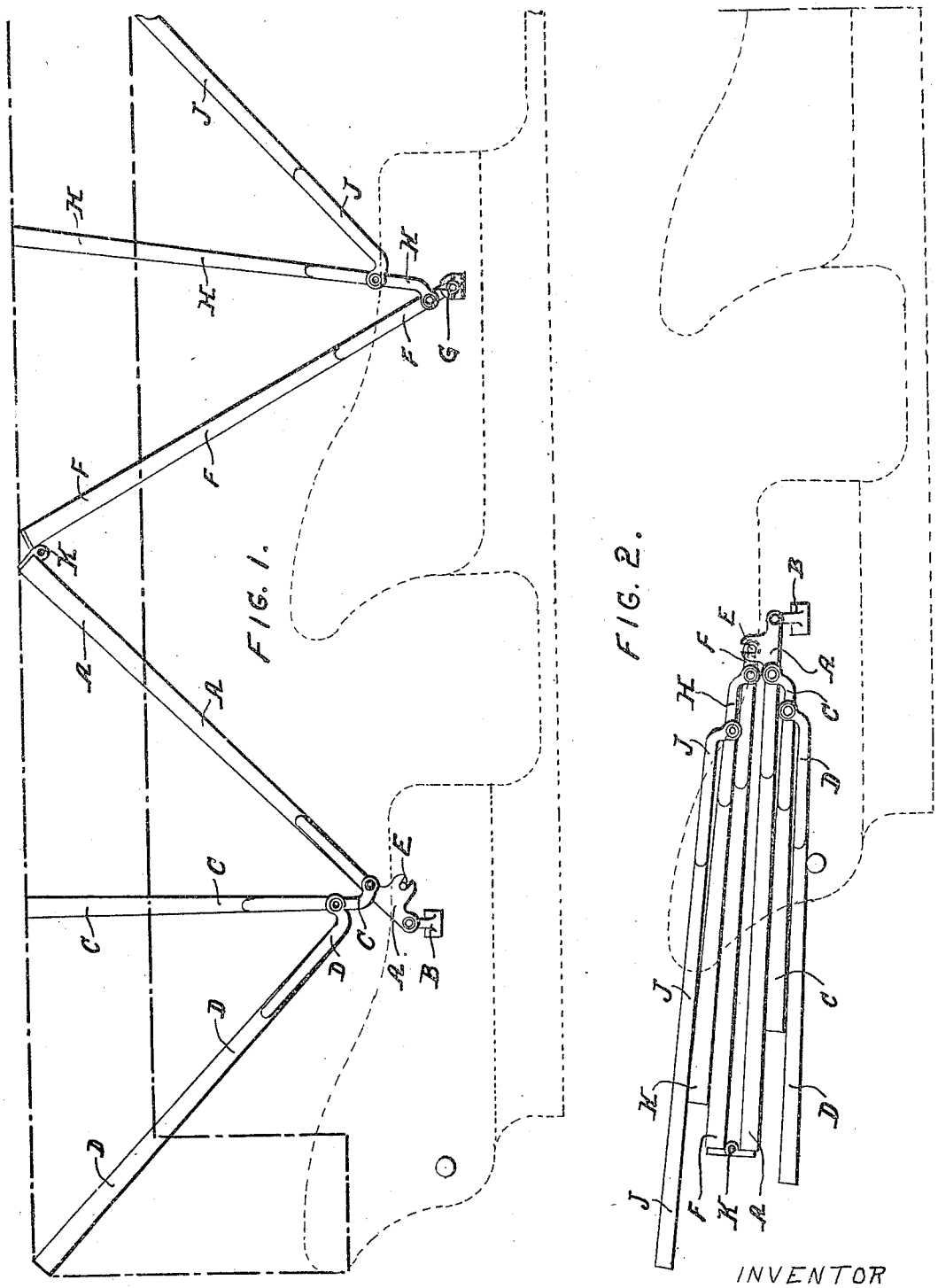

JAMES SIME CREE, OF GLASGOW, SCOTLAND.

HOOD FOR MOTOR OR OTHER VEHICLES.

960,832.      Specification of Letters Patent.      Patented June 7, 1910.

Application filed August 20, 1909. Serial No. 513,878.

*To all whom it may concern:*

Be it known that I, JAMES SIME CREE, a subject of the King of Great Britain and Ireland, and a resident of Glasgow, Scotland, have invented a certain new and useful Improved Hood for Motor or other Vehicles, of which the following is the specification.

What is known as the "Cape-Cart hood", as applied to motor vehicles, usually consists of two series of hoops transverse to the vehicle, the hoops of each series being pivoted at their lower ends upon one another. The rear series are pivoted upon side brackets toward the rear of the vehicle, while the front series are pivoted upon side brackets toward the front, when the hood is extended. When the hood is to be closed, the front series of hoops are transferred to the rear brackets, and the whole folded together toward the rear of the vehicle.

My invention consists in an improved construction whereby the hood may be conveniently erected or closed by one person even, without his leaving the vehicle.

In order that the invention and the manner of performing the same may be properly understood, there is hereunto appended a sheet of explanatory drawings showing in Figures 1 and 2 diagrammatic side elevations of an example of the improved hood in two positions.

According to this simple example, the front hoop A of the rear series is pivoted directly upon the usual brackets B upon the sides of the body (indicated by dotting). To it is pivoted the second hoop C of that series, and to that in turn is pivoted the third and rearmost hoop D all in known manner. The front hoop A of this series carries near its point of pivoting the usual clip or jaw E to receive the rear hoop F of the front series, which is directly pivoted in usual manner and removably in the jaws of the front brackets G. It carries pivoted upon it in usual manner the second hoop H of this series and which in turn carries the third and foremost hoop J of the front series.

The front hoop A of the rear series and rear hoop F of the front series incline toward each other at such angles that their upper and horizontal parts abut, and these parts are connected by hinges K. It is at once apparent that, as already explained, these hinges K serve to support the hoops F, H, J, of the front series after they have been removed from the brackets G, while the hood is being folded and until the pivot studs of the rear hoop F of that series are inserted in the jaws E of the rear brackets and the whole hood folded as in Fig. 2.

Any form of pivotal attachment may be provided between the hoops A F, and any number of hoops may be used in each series, but it is clear that to fulfil the essential intention of the invention the hoops in each series must be pivoted either one upon the other or all upon common pivot plates or the like, for if that type of hood be used in which the intermediate hoops are not pivoted but linked to adjacent ones the object of the invention is defeated in so far as that the hood cannot then be readily closed without assistance.

There may be struts between the hoops of either or both series, while usual arrangements are provided for securing the front and rear of the hood when it is erected and for holding its parts together when it is closed.

What I claim is:—

A hood for motor or other vehicles, comprising front and rear series of adjacently pivoted hoops relatively so positioned upon the vehicle that the front hoop of the rear series and the rear hoop of the front series abut at their upper parts when the hood is open and pivotal connection between the abutting parts, the supplemental hoops in each series being carried by said abutting hoops respectively.

In testimony whereof I have signed my name to this specification, in the presence of two subscribing witnesses.

JAMES SIME CREE.

Witnesses:
     DAVID FERGUSON,
     BARBARA MILLER.